United States Patent [19]

Welsh et al.

[11] 4,123,499
[45] Oct. 31, 1978

[54] RECOVERING METAL VALUES FROM MARINE MANGANESE NODULES

[75] Inventors: Jay Y. Welsh, Catonsville; Irving Sochol, Baltimore, both of Md.

[73] Assignee: Chemetals Corporation, Baltimore, Md.

[21] Appl. No.: 798,773

[22] Filed: May 20, 1977

[51] Int. Cl.² .............................................. C01G 45/02
[52] U.S. Cl. ...................................... 423/35; 423/37;
    423/49; 423/50; 423/144; 423/150; 423/140;
    423/605; 423/DIG. 1; 423/DIG. 4
[58] Field of Search ...................... 423/34, 35, 37, 49,
    423/50, 140, 144, 150, 605, DIG. 4, DIG. 1

[56] References Cited
U.S. PATENT DOCUMENTS

| | | | |
|---|---|---|---|
| 2,842,436 | 7/1958 | Dasher et al. | 423/150 |
| 3,169,856 | 2/1965 | Mero | 423/150 |
| 3,578,394 | 5/1971 | Palmer | 423/49 |
| 3,780,159 | 12/1973 | Welsh | 423/49 |
| 3,787,306 | 1/1974 | Senior | 423/DIG. 1 |
| 3,950,505 | 4/1976 | Sochol | 423/605 |

*Primary Examiner*—Brian Hearn
*Attorney, Agent, or Firm*—Chemetals Corporation

[57] ABSTRACT

A method for selectively extracting metal values from manganese bearing ores such as marine nodules. The ore is initially leached to solubilize manganese and other desirable metals as nitrates. The resulting solution is then treated with manganous hydroxide to selectively precipitate metals such as copper, nickel and cobalt. The enriched mixture of metal hydroxides is separated from the manganese nitrate solution, which is decomposed to recover high purity $MnO_2$.

9 Claims, 2 Drawing Figures

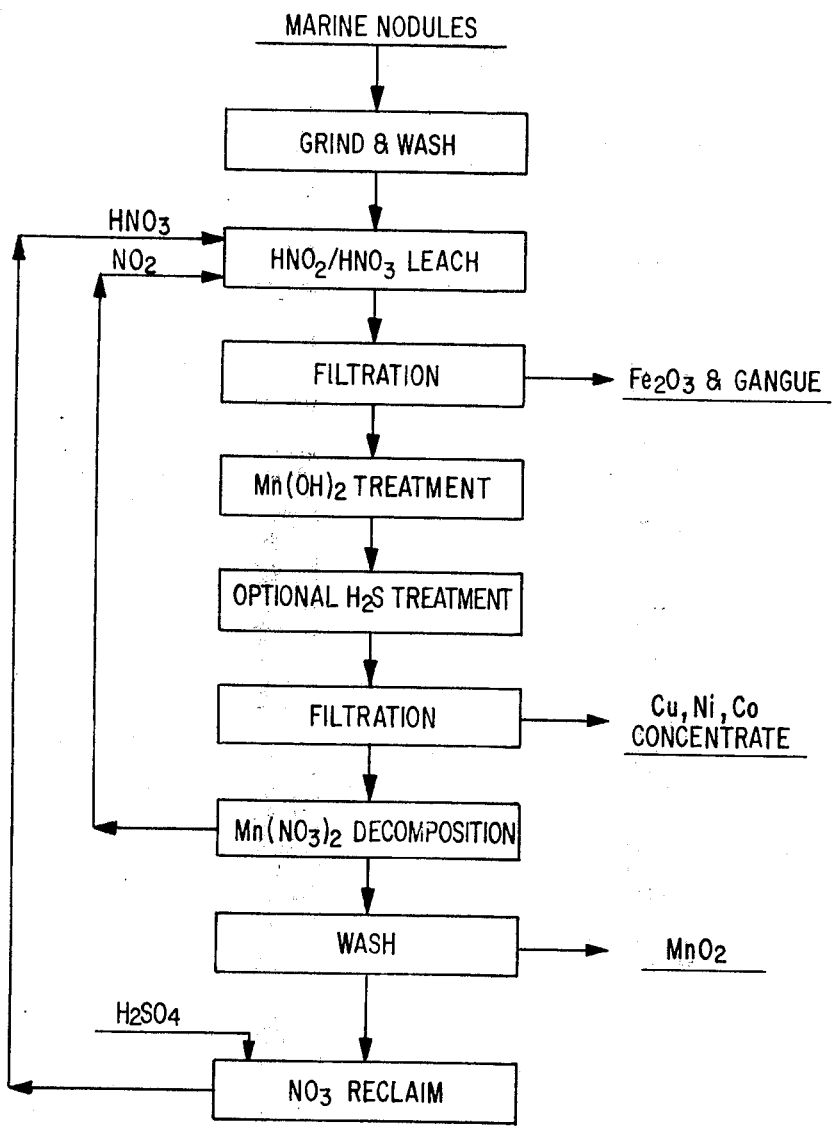
Fig. I

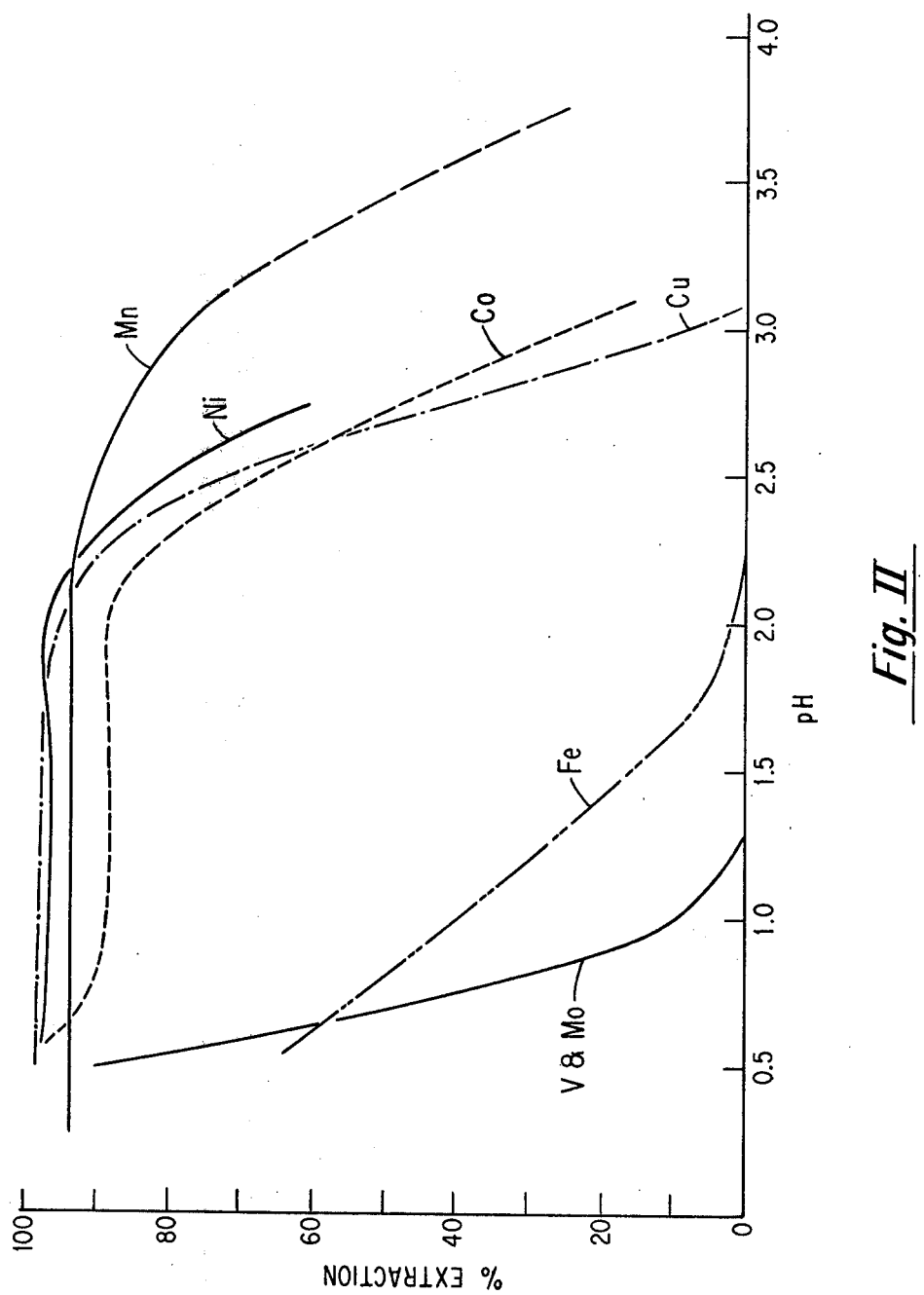
Fig. II

RECOVERING METAL VALUES FROM MARINE MANGANESE NODULES

FIELD OF THE INVENTION

This invention relates generally to a method for the recovery of metal values from manganese bearing ores, and more particularly to hydrometallurgical leaching process for the selective extraction and concentration of manganese, copper, nickel and cobalt from marine nodules.

BACKGROUND OF THE INVENTION

Underwater deposits of manganese bearing ores have been investigated for many years, but only recently have economic and environmental concerns encouraged the development of these materials as a viable alternative to conventional onshore mining. The underwater deposits variously referred to as marine nodules, ocean-floor nodules, manganese nodules, or maritime manganese ores, are distributed throughout the open oceans of the world and have recently been discovered on the floor of inland lakes such as Lake Michigan.

Although the distribution of marine nodules is broad, it is also quite uneven, with areas of concentration occurring both at great ocean depths and on the shallower continental shelf. The characteristics of the nodules vary from one deposit to another, showing considerable differences in size, shape, internal structure, and composition. In general, the nodules are primarily agglomerates of manganese and iron oxides, containing lesser proportions of compounds of copper, nickel and cobalt along with traces of some two dozen metals such as molybdenum, lead, barium, vanadium, chromium, and titanium, as well as various minerals plus alkali and alkaline earth metals. The metal content is generally dependent upon the region from which the nodules are obtained, and the economically important components may occur within broad ranges. For example, manganese content may range from 5 to 50 percent (dry weight), iron from 5 to 40 percent, copper from 0.03 to 2 percent, nickel from 0.1 to 2 percent, and cobalt from 0.01 to 3 percent.

This wide variation in metal values has complicated the refining of nodules and has led to the development of numerous processes for extracting the desirable materials. Straightforward physical methods for separating the metals have not been successful due to the extremely fine-grained nature of the primary manganese oxide and iron oxide constituents. Pyrometallurgical techniques likewise have not been notably successful, probably due to the formation of complex alloys that are quite difficult to separate. Consequently, the most effort has been directed to hydrometallurgical processes.

The chemical approaches to nodule benefication have centered on leaching, since this technique eliminates the need for drying the nodules to remove the 30–40 weight percent of moisture normally present. Several investigators have used a sulfuric acid leach in multistage autoclaves at 230° C. and 500 psig. The acid readily dissolves copper, nickel and cobalt under these conditions, and these metals are recovered by liquid ion exchange and electrowinning. Large quantities of acid are required, probably due to the presence of basic materials trapped in the nodule, and significant quantities of iron and manganese are also dissolved into the leach liquor. Most of the manganese in the nodules is discarded in the tailings from this process.

Other workers have based a leaching process on the use of hydrogen chloride to convert the metals to soluble chlorides. Ferric chloride is removed from solution by solvent extraction, then decomposed to $Fe_2O_3$ and HCl. Copper, nickel, and cobalt are coprecipitated by cementation with manganese metal, then are separated by liquid ion exchange and recovered by electrowinning. The manganese chloride is processed by displacement with aluminum metal to recover manganese metal. Thus expensive processing steps and reagents are necessary to deal with the iron and manganese extracted, which places the recovered manganese at a cost disadvantage.

Another method involves crushing, drying, and roasting of the nodules in a reducing atmosphere, followed by leaching with an ammonia-ammonium carbonate solution. Countercurrent decantation washes the solubilized metals, primarily copper, nickel and cobalt, from the gangue. Liquid ion exchange removes the metals from the leach liquor and separates them for recovery by electrowinning or precipitation. Manganese is discarded with the gangue.

It is apparent in all of the conventional processing schemes that manganese, the principal component of marine nodules, is a liability. Either it is discarded with the process tailings or it is recovered at considerable expense, resulting in an economic disadvantage to the entire process. Conventional techniques have not provided a simple, direct method for selectively separating iron and manganese from the nodules and from each other without high processing costs, while at the same time efficiently recovering other desirable metal values such as copper, nickel and cobalt from the nodules.

SUMMARY OF THE INVENTION

It has been discovered that manganese bearing ores such as marine nodules can be refined and the various metal values efficiently recovered by first leaching the ore in an aqueous solution of nitrous and nitric acids to selectively solubilize the manganese, copper, nickel and cobalt as their respective nitrates, then separating from the leach slurry the insoluble iron oxide and gangue. The solution is then treated with manganous hydroxide in an amount at least equal to the stoichiometric value of metals other than manganese present in the solution. This treatment precipitates substantially all of the copper, nickel and cobalt as their hydroxides. If desired, the filtrate may optionally be further treated at this point by the addition of hydrogen sulfide, which precipitates the remaining traces of copper, nickel and cobalt and assures virtually complete separation of these metals from the nitrate solution.

After filtration to remove the mixed metal hydroxide and sulfide precipitates, the solution containing manganese nitrate is subjected to a thermal decomposition step. Manganese dioxide of high purity is recovered from this step, along with nitrogen dioxide which may be recycled to the leach solution. The mixed precipitates of copper, nickel and cobalt may be easily separated and the individual metal values recovered by conventional processes.

The method of the invention provides numerous advantages over prior nodule treatments, in that the leaching step is direct and straightforward, yet retains a high extraction efficiency of manganese, copper, nickel and cobalt. Substantially all of the iron oxide remains in the gangue. The subsequent steps result in complete separation of copper, nickel and cobalt in a form easily adaptable to further processing, and the manganese is obtained as a high purity $MnO_2$.

Additionally, the production of high purity manganese dioxide at low cost provides an economic benefit, in that the recovered manganese values can defray the overall processing costs. This is in contrast to prior techniques, which necessarily relied upon recovery of the minor metal values from nodules for economic viability. Thus the predominant manganese content of marine nodules becomes an asset to the method of the invention, rather than a liability.

A further advantage results from operation of the method in a cyclic manner, with return of the coproduct from the manganese nitrate decomposition step to the leaching and precipitation steps. This eliminates the introduction of expensive additional reagents, and greatly lessens the necessity for pollution control measures.

A still further advantage lies in the adaptability of the method to the processing of lower grade marine nodules. The separation efficiency of the method combined with the economic advantage of manganese recovery make use of the lower grade nodules commercially feasible. This is a most important aspect, as these nodules are often found at the shallower ocean depths and thus are more attractive from the standpoint of mining.

BRIEF DESCRIPTION OF THE DRAWINGS

FIG. I is a flow diagram illustrating a cyclic embodiment of the method.

FIG. II is a graph illustrating the leaching efficiency of various elements from typical Pacific marine nodules as a function of pH, using $HNO_2/HNO_3$ solution.

DETAILED DESCRIPTION OF THE INVENTION

In the practice of the method, marine nodules are used in essentially the state in which they are recovered from underwater. No drying step is generally necessary to remove the moisture content, and in fact it has been found beneficial to wash the nodules with sufficient fresh water to remove soluble chloride salts. Such a wash eliminates the uptake of soluble minerals into the leach solution and their carryover into subsequent processing steps. It has also been found helpful to crush or grind larger nodules, either before or after water washing, to reduce their average size. Since the nodules have porosities of about 60 percent by volume, crushing is not required to assure efficient leaching, however such a step does make handling more convenient. Due to their extreme porosity the nodules are friable and easily ground, so that this step does not involve significant investment in equipment or power. Reduction of the nodules to an average size of about 4 mesh has been found to facilitate processing.

The step of leaching the nodules is conducted with an aqueous solution of nitrous acid ($HNO_2$) and nitric acid ($HNO_3$), usually prepared by the dissolution of nitrogen dioxide in water. This $NO_2$, and additional $HNO_3$ if required, can be recycled to the leach solution from the later decomposition and reclamation steps, thus eliminating the necessity for frequent replenishment of the leach solution with fresh reagents. For the most efficient extraction of manganese, copper, nickel and cobalt from the nodules, coupled with the least dissolution of iron, the pH of the leach solution should be maintained below about 2.5. Leach efficiency as a function of pH is shown in FIG. II. Preferably, the solution will be maintained at a pH of 1.0–2.0. Using the preferred conditions, the extraction of Mn, Cu, and Ni as soluble nitrates will be better than 87 percent. The extraction of Co will be in the range of 80–85 percent. Better than 99 percent of the Fe will be retained in the gangue.

The overall leaching step is similar in theory and operation to that described by Welsh in U.S. Pat. No. 3,780,159, the disclosure of which is hereby incorporated by reference. As noted in this patent, advantageous leach conditions may also include parameters such as maintaining a quantity of nodules in the leach solution sufficient to provide a stoichiometric excess of manganese dioxide equivalent in relation to the nitrous acid content of the aqueous solution, maintaining a leach solution temperature below about 80° C., and maintaining the equilibrium partial pressure of a combination of nitric oxide and water vapor over the solution at less than atmospheric pressure. Such parameters, while not critical, are conducive to a much more efficient leaching of marine nodules.

Upon completion of the leaching step, the resulting slurry is treated to remove the insoluble iron oxides, minerals and gangue. The usual treatment is filtration, carried out with conventional apparatus, at a pH of less than 2.5. The gangue and iron oxides are normally discarded as tailings.

The filtrate, containing the Mn, Cu, Ni, Co and alkali and alkaline earth metals as their nitrates, is treated with manganous hydroxide [$Mn(OH)_2$] to adjust the pH and precipitate principally the Cu, Ni, and Co as hydroxides. It is standard practice in the production of electrolytic manganese metal to adjust the pH of recycle electrolyte solutions to a value of 6 or higher with lime or $NH_4OH$. The heavy metal impurities are then precipitated by the addition of sulfide ion added either as $H_2S$ or ammonium sulfide. In the preparation of purified manganese salt solutions, the general practice is to use either reduced ore or MnO to adjust the pH to values of 4 to 6.

It is apparent from the chemistry of the overall nitrate process as outlined above and as described in U.S. Pat. No. 3,780,159, that the addition of ammonium, alkali or alkaline earth compounds constitute undesirable process impurities. The pH adjustment of the nitrate leach solution in order to either precipitate hydroxides, or as a preliminary step to the addition of sulfide ion, should therefore be done with a basic manganese compound.

The use of $Mn(OH)_2$ as the precipitating agent is essential to commercial success of the method for a number of reasons. The precipitation should be effected at a pH of 6 or slightly below in order to insure selective separation of the Cu, Ni and Co, and $Mn(OH)_2$ is a buffering alkaline agent inherently capable of achieving and maintaining the desired pH. The $Mn(OH)_2$ also is non-contaminating in the sense that no extraneous ions are introduced into the solution, i.e. no additional base need be added to adjust pH which would be carried into the subsequent processing steps. The only metal introduced into the manganese nitrate solution is additional manganese, which is of course conserved by conversion to $Mn(NO_3)_2$.

Although prior practice has utilized MnO for pH adjustment of manganese salt solutions, it is neither the preferred alkaline agent nor the most efficient. It is necessary to use an excess of MnO in order to attain the required pH adjustment causing a substantial manganese contamination in the Ni, Co, Cu concentrates. Further, the neutralization reaction with MnO is slow and introduces a time consuming step in the process. It is an advantage of this invention to improve markedly this neutralization and precipitation step by using $Mn(OH)_2$ instead of MnO.

The following Table clearly shows the significant improvement in stoichiometric efficiency using $Mn(OH)_2$ for pH adjustment, as compared to MnO. Equal amounts of Mn equivalent were initially added as $Mn(OH)_2$ and MnO to 250 ml portions of a 35 weight percent $Mn(NO_3)_2$ leach solution. The initial solution pH was 1.0, and the pH was measured as a function of time. The Table shows that the neutralization is practically instantaneous with $Mn(OH)_2$, while the MnO neutralization is excessively slow and requires substantially more Mn equivalent.

TABLE

| Time | $MnOH_2$ Addition | | MnO Addition | |
|---|---|---|---|---|
| | Mn Added | pH | Mn Added | pH |
| 0 min | 1.3 gm | 1.0 | 1.3 gm | 1.0 |
| 10 | — | 4.8 | 0.19 | 2.7 |
| 20 | — | — | 0.37 | 3.1 |
| 30 | — | — | — | 3.3 |
| 110 | — | — | 0.37 | 3.9 |
| 130 | — | — | — | 4.5 |
| 180 | — | — | 0.37 | 4.5 |
| 240 | — | — | — | 4.8 |
| | 1.3 gm total | | 2.6 gm total | |

Manganous hydroxide prepared by any of the several known methods is suitable for use, however, it is preferred to use $Mn(OH)_2$ prepared as described by Sochol in U.S. Pat. No. 3,950,505, the disclosure of which is hereby incorporated by reference. $Mn(OH)_2$ prepared by this method is of particularly high purity, containing no salt contaminants.

The use of $Mn(OH)_2$ in conjunction with $H_2S$ provides a preferred precipitation system for Co, Ni, and Cu from the nitrate solutions of this process. Neutralization is rapid and efficient while the metallic sulfide precipitation occurs at pH values $\geq$ 5. This pH range prevents oxidation of sulfide ion by the nitrate ion with its resulting loss of reagent. Furthermore, with $H_2S$ there is no process contamination from the introduction of extraneous metal ions. The amount of $H_2S$ used for this optional precipitation is not critical, and generally will range up to or in slight excess of the $Mn(OH)_2$.

The combination of $Mn(OH)_2$ and $H_2S$ to precipitate Cu, Ni, and Co may be done in either one or two steps. In the one-step procedure, the $Mn(OH)_2$ is added in a quantity equal to or in slight excess of the stoichiometric value of metals other than manganese (principally Cu, Ni, and Co) present in the filtrate, in order to insure substantially complete precipitation of these metals. $H_2S$ is then added in an amount equal to the stoichiometric value of metals present. The presence of $Mn(OH)_2$ acts as a buffer and prevents the pH from becoming acidic. A shift in pH thus becomes an indication of the consumption of $Mn(OH)_2$ and the complete precipitation of Cu, Ni and Co.

In a two-step procedure, the nitrate solution is treated with $Mn(OH)_2$ as before. The precipitated hydroxides are then removed by filtration. In many instances this single treatment will remove substantially all of the Cu, Ni, and Co, and additional treatment is not necessary. However, under some conditions a small amount of these metals may remain in solution under equilibrium conditions. If more complete separation is desired, the optional second step of a combined $Mn(OH)_2/H_2S$ precipitation may be carried out to scavenge any remaining Cu, Ni, and Co.

Such a two-step process has the additional advantage of requiring the use of considerably less $H_2S$, with the resulting generation of less metallic sulfides. The reduced amount of sulfides minimizes potential sulfur pollution problems in the recovery of the metals from their respective hydroxide/sulfide concentrations.

By use of the foregoing steps, virtually 100 percent of the Cu, Ni and Co is separated from the manganese nitrate solution. The metal hydroxides or mixed hydroxides and sulfides are removed by filtration. Subsequent processing to separate the Cu, Ni and Co and to recover the pure metals may utilize any of several well-known techniques. The most common methods involve liquid ion exchange to separate the materials, followed by electrowinning to obtain the pure metals.

After removal of the Cu, Ni and Co concentrate from the leach solution, the filtrate contains predominantly manganese nitrate along with lesser amounts of soluble alkali and alkaline earth metal nitrates. This filtrate is concentrated and the $Mn(NO_3)_2$ is thermally decomposed to recover high purity $MnO_2$. The thermal decomposition can be carried out by methods such as those described in U.S. Pat. Nos. 2,779,659 and 2,681,268. A decomposition process similar to that disclosed in U.S. Pat. No. 3,780,158 is preferred.

The decomposition of manganese nitrate yields not only manganese dioxide, but also nitrogen dioxide gas. This $NO_2$, along with associated water vapor, can be conveniently recycled to the leach solution and used in the formation of nitrous and nitric acids. The alkali and alkaline earth nitrates present in the $Mn(NO_3)_2$ solution, which are normally not decomposed, are removed from the $MnO_2$ product by a countercurrent wash. These materials may then be mineral acid treated, for example with $H_2SO_4$, to reclaim the $NO_3$ value as $HNO_3$. The $HNO_3$ is then recycled to the leach solution, and the alkali and alkaline earth sulfate can be discarded as non-polluting tailings.

The method of the invention can be conducted in a batchwise manner, or more advantageously in a continuous fashion with recycle of the $NO_2$ and $HNO_3$ reagents.

The invention is further illustrated in the following specific example.

EXAMPLE

Pacific marine nodules (800 gm) analyzing approximately 29% Mn, 1.4% Ni, 1.1% Cu, and 0.25% Co were ground and leached in an agitated solution of nitrous and nitric acids resulting from the absorption of $NO_2$ in water. The pH of the slurry was adjusted to 2.0 using $HNO_3$, and the final volume of the leach solution was 2.2 liters. After leaching, the solids were separated and both the liquid and solid phases were analyzed.

| Element | Solid | Liquid |
|---|---|---|
| Mn | 21.9 gm | 215 gm |
| Ni | 0.46 | 9.7 |
| Cu | 1.18 | 7.8 |
| Co | 0.27 | 1.5 |
| Fe | — | (nil) |

From this analysis, the following leaching efficiencies were calculated — Mn (90.7%), Ni (95.5%), Cu (86.9%), and Co (85.0%). The filtered leach solution was then treated with about 44 grams of $Mn(OH)_2$, resulting in a solution pH of 5.8. The precipitate which formed was separated by filtration, washed, and found to contain 9.1 gm Mn, 9.2 gm Ni, 7.8 gm Cu, and 1.3 gm. Co. The filtrate contained 0.3 gm Ni, 0.2 gm Co, and undetectable Cu.

A second addition of 2.9 grams of $Mn(OH)_2$ was made to the filtrate, followed by sufficient $H_2S$ to shift the solution pH to 5.0. The liquid phase of the resulting slurry contained less than 1 ppm Ni and Co.

What is claimed is:

1. A method for refining manganese bearing marine nodules, comprising:
    (a) leaching the nodules with an aqueous solution of nitrous and nitric acids having a pH below about 2.5 to selectively dissolve manganese, copper, nickel, and cobalt coupled with the least dissolution of iron;
    (b) separating insoluble iron oxide and gangue from the leach solution at a pH of less than 2.5;
    (c) adding to the solution a quantity of manganous hydroxide at least equal to the stoichiometric value of the metals other than manganese present in the solution to selectively precipitate copper, nickel, and cobalt;
    (d) removing precipitated copper, nickel, and cobalt hydroxides from the manganese nitrate containing solution.

2. The method of claim 1 including the additional step of
    (e) decomposing the manganese nitrate solution and recovering a manganese oxide concentrate.

3. The method of claim 1 wherein the leach solution has a pH of 1.0–2.0.

4. The method of claim 1 wherein the temperature of the leach solution is maintained below about 80° C.

5. The method of claim 1 wherein manganous hydroxide is added to the solution in an amount slightly in excess of the stoichiometric value of copper, nickel, and cobalt present in solution.

6. The method of claim 1 wherein step (c) includes the additional step of adding hydrogen sulfide to the solution.

7. The method of claim 2 wherein the decomposition of the manganese nitrate solution is achieved by thermal means and includes the return of resulting nitrogen dioxide to the leach solution of step (a).

8. A method of processing marine nodules to selectively recover manganese values, the nodules comprising primarily oxides of Mn and Fe with lesser proportions of compounds of Cu, Ni, Co, alkali metals and alkaline earth metals, which method comprises the steps of:
    (a) washing the nodules with water until substantially all soluble chloride salts have been removed;
    (b) leaching the nodules at a temperature below about 80° C. with an aqueous solution of nitrous and nitric acids having a pH of 1.0–2.0 under an equilibrium partial pressure of a combination of nitric oxide and water vapor less than atmospheric pressure, wherein said nodules contain a stoichiometric excess of manganese dioxide equivalent in relation to the nitrous acid content of the aqueous solution, to selectively dissolve Mn, Cu, Ni, and Co while retaining substantially all of the iron oxide in the gangue;
    (c) filtering the resulting slurry containing Mn, Cu, Ni, Co, alkali metal and alkaline earth metal nitrates at a pH of less than 2.5 to remove insoluble iron oxide and gangue;
    (d) adding $Mn(OH)_2$ to the filtrate in a quantity at least equal to the stoichiometric value of the Cu, Ni and Co metals present in the solution to selectively precipitate said metals as hydroxides;
    (e) adding to the filtrate a quantity of $H_2S$ in any proportion up to the $Mn(OH)_2$ equivalent present to precipitate additional metal traces as sulfides;
    (f) filtering the solution to remove precipitated metals and separate the manganese nitrate solution.

9. The method of claim 8 including the additional steps of:
    (g) thermally decomposing the manganese nitrate solution to recover $MnO_2$ and $NO_2$;
    (h) transferring the $NO_2$ from step (g) to the aqueous solution of step (b);
    (i) separating undecomposed alkali and alkaline earth metal nitrates remaining from step (g) from the $MnO_2$, treating said metal nitrates with a mineral acid, and transferring the $HNO_3$ thus produced to the aqueous solution of step (b).

* * * * *